No. 770,137. Patented September 13, 1904.

UNITED STATES PATENT OFFICE.

HENRY F. WILLIAMS, OF SAN FRANCISCO, CALIFORNIA.

MANUFACTURE OF PAVING OR ROOFING COMPOSITION.

SPECIFICATION forming part of Letters Patent No. 770,137, dated September 13, 1904.

Application filed February 5, 1904. Serial No. 192,223. (No specimens.)

*To all whom it may concern:*

Be it known that I, HENRY F. WILLIAMS, a citizen of the United States, residing at San Francisco, in the county of San Francisco and State of California, have invented certain new and useful Improvements in the Manufacture of Paving or Roofing Compositions, of which the following is a specification.

What is known as "bituminous sandrock" is a natural product existing in large quantities along the Pacific Coast. It is found in ledges or veins and consists of sand impregnated with heavy hydrocarbons. This material was used some years ago for making paving compositions, and many miles of such pavement were laid in cities on the Pacific Coast. It was unsatisfactory in several respects, principally on account of its loose, friable, and brittle nature, and when manufactured asphaltum produced from California oil having an asphaltic base came into use as a commercial article it was superseded and practically went out of use. There are, however, on the Pacific Coast inexhaustible quantities of this material, which has at present little commercial value; and the object of my invention is to so treat it that it will become a valuable material for paving, roofing, and like purposes.

My treatment is a hardening and toughening process which changes the original nature of the material and fits it for the uses suggested, and hence one part of my invention resides in the said process and another part in the improved composition thereby produced.

In Letters Patent No. 661,362, dated November 6, 1900, I described a composition of asphaltum and lime-sludge resulting from the purification of beet-syrup in sugar manufacture, such lime-sludge being calcined limestone which has taken up carbonic acid in the purifying process and from which the juice has been expressed, leaving a lime cake charged with carbonic acid. I have discovered that the lime cake or sludge can be mixed with natural bituminous sandrock with remarkable results in changing the original nature of said sandrock from a comparatively loose friable sandy material to a hard tough compound of great cohesion, tenacity, and resistance. The nature of the material so treated appears to be entirely changed, so that it becomes adapted for use in paving, roofing, &c., with all its inherent defects overcome or removed. This result cannot be produced by treating the sandrock with crushed limestone or marble, no matter how finely ground mechanically, because in the first place crystallization is not destroyed and the mixture remains soft, friable, and non-cohesive. In the second place the expense of manufacturing and using mechanical crushers is so considerable as to deprive the resulting product of that cheapness which constitutes one of its chief advantages.

In employing my process the sandrock is softened by heat and then mixed with the lime-sludge in the general proportion of about ninety parts of sandrock to ten parts of lime-sludge; but I do not wish to be limited or confined to such proportions, as they may be varied within reasonable limits, according to the nature of the material being treated and the uses to which the ultimate composition is to be put. The lime-sludge being calcined limestone which has been recharged with carbonic acid is an amorphous material which by ordinary grinding can be reduced to an impalpable powder without the presence of crystallization. There is a strong affinity between the carbonic acid therein and the bituminous matter or hydrocarbon, and the result is an extraordinary increase in toughness, hardness, cohesion, and tenacity which makes bituminous sandrock a practical commercial article for the described purposes.

The composition can, if necessary, be mixed with gravel, broken stone, or other suitable material, according to its use as paving, roofing, or the like.

Having described my invention, what I claim is—

1. The process of treating bituminous sandrock which consists in softening said rock and then mixing with it lime-sludge produced in the manufacture of beet-sugar whereby the said rock is hardened and toughened.

2. A composition for the described purposes consisting of natural bituminous sandrock, mixed with lime-sludge, said lime-sludge being calcined lime which has been recharged with carbonic acid in the purification of beet-root sugar.

In testimony whereof I have affixed my signature, in presence of two witnesses, this 18th day of December, 1903.

HENRY F. WILLIAMS.

Witnesses:
L. W. SEELY,
M. R. SEELY.